United States Patent
Zhu et al.

(10) Patent No.: US 9,639,747 B2
(45) Date of Patent: May 2, 2017

(54) ONLINE LEARNING METHOD FOR PEOPLE DETECTION AND COUNTING FOR RETAIL STORES

(71) Applicant: Pelco, Inc., Clovis, CA (US)

(72) Inventors: Hongwei Zhu, Fresno, CA (US); Farzin Aghdasi, Clovis, CA (US); Greg M. Millar, Coarsegold, CA (US); Stephen J. Mitchell, Reedley, CA (US)

(73) Assignee: Pelco, Inc., Clovis, CA (US)

( * ) Notice: Subject to any disclaimer, the term of this patent is extended or adjusted under 35 U.S.C. 154(b) by 0 days.

(21) Appl. No.: 13/839,410

(22) Filed: Mar. 15, 2013

(65) Prior Publication Data

US 2014/0270358 A1    Sep. 18, 2014

(51) Int. Cl.
G06K 9/00    (2006.01)
G06K 9/38    (2006.01)
G06K 9/46    (2006.01)
G06K 9/62    (2006.01)
G06Q 30/02   (2012.01)

(52) U.S. Cl.
CPC ..... G06K 9/00369 (2013.01); G06K 9/00771 (2013.01); G06K 9/38 (2013.01); G06K 9/4642 (2013.01); G06K 9/6262 (2013.01); G06K 9/6267 (2013.01); G06Q 30/0201 (2013.01)

(58) Field of Classification Search
None
See application file for complete search history.

(56) References Cited

U.S. PATENT DOCUMENTS

| 7,003,136 | B1 | 2/2006 | Harville |
| 7,359,555 | B2 * | 4/2008 | Porikli ................. G03B 15/006 382/204 |
| 7,391,907 | B1 | 6/2008 | Venetianer et al. |
| 7,602,944 | B2 * | 10/2009 | Campbell .......... G06K 9/00778 375/240 |
| 7,787,656 | B2 | 8/2010 | Chen |

(Continued)

FOREIGN PATENT DOCUMENTS

WO    WO 2014/081688 A1    11/2013
WO    WO 2014/081687 A1    5/2014

(Continued)

OTHER PUBLICATIONS

Zeng et al—Robust Head-shoulder detection by PCA based HOG-LBP detector—IEEE internationa conf on pattern REcognition 2010.*

(Continued)

*Primary Examiner* — Iman K Kholdebarin
(74) *Attorney, Agent, or Firm* — Hamilton, Brook, Smith & Reynolds, P.C.

(57) ABSTRACT

People detection can provide valuable metrics that can be used by businesses, such as retail stores. Such information can be used to influence any number of business decisions such a employment hiring and product orders. The business value of this data hinges upon its accuracy. Thus, a method according to the principles of the current invention outputs metrics regarding people in a video frame within a stream of video frames through use of an object classifier configured to detect people. The method further comprises automatically updating the object classifier using data in at least a subset of the video frames in the stream of video frames.

21 Claims, 6 Drawing Sheets

(56) References Cited

U.S. PATENT DOCUMENTS

| | | | |
|---|---|---|---|
| 7,965,866 B2* | 6/2011 | Wang | G06K 9/00771 382/103 |
| 8,107,676 B2* | 1/2012 | Senior | G06K 9/00771 382/103 |
| 8,238,607 B2 | 8/2012 | Wang et al. | |
| 8,306,265 B2* | 11/2012 | Fry | A61B 5/0452 348/143 |
| 8,542,879 B1 | 9/2013 | Nechyba | G06K 9/00228 382/103 |
| 8,600,108 B2* | 12/2013 | Tang | G06T 7/2033 382/103 |
| 8,639,020 B1 | 1/2014 | Kutliroff | G06T 7/0071 345/420 |
| 8,744,125 B2* | 6/2014 | Zhu | G06K 9/68 382/103 |
| 8,769,557 B1 | 7/2014 | Terrazas | |
| 9,001,199 B2* | 4/2015 | Sinha | G06K 9/00369 348/77 |
| 9,076,065 B1 | 7/2015 | Vijayanarasimhan | G06K 9/6256 |
| 2003/0107649 A1 | 6/2003 | Flickner et al. | |
| 2003/0152267 A1* | 8/2003 | Pirim | G06T 7/401 382/170 |
| 2003/0169906 A1 | 9/2003 | Gokturk et al. | |
| 2003/0235341 A1 | 12/2003 | Gokturk et al. | |
| 2005/0111737 A1* | 5/2005 | Das | G06T 11/60 382/190 |
| 2006/0115116 A1 | 6/2006 | Iwasaki et al. | |
| 2006/0285724 A1 | 12/2006 | Tian | |
| 2007/0019073 A1* | 1/2007 | Comaniciu | G06T 7/0048 348/148 |
| 2007/0047837 A1 | 3/2007 | Schwab et al. | |
| 2007/0098222 A1 | 5/2007 | Porter et al. | |
| 2008/0166045 A1 | 7/2008 | Xu et al. | |
| 2008/0285802 A1* | 11/2008 | Bramblet | G07C 9/00 382/103 |
| 2009/0215533 A1 | 8/2009 | Zalewski et al. | |
| 2009/0244291 A1* | 10/2009 | Saptharishi | G06K 9/00771 348/187 |
| 2010/0027875 A1* | 2/2010 | Hampapur | G06K 9/00778 382/159 |
| 2010/0066761 A1* | 3/2010 | Tousch | G06K 9/342 345/629 |
| 2010/0124357 A1* | 5/2010 | Hampapur | G06T 7/2046 382/103 |
| 2010/0266175 A1* | 10/2010 | Seung | G06T 7/0081 382/128 |
| 2010/0274746 A1* | 10/2010 | Rickert | G06K 9/00536 706/14 |
| 2010/0290700 A1* | 11/2010 | Yokono | G06K 9/00369 382/159 |
| 2010/0329544 A1* | 12/2010 | Sabe | G06K 9/00288 382/159 |
| 2011/0026770 A1* | 2/2011 | Brookshire | G05D 1/0251 382/103 |
| 2011/0058708 A1 | 3/2011 | Ikenoue | |
| 2011/0078133 A1* | 3/2011 | Bordawekar | G06F 17/30979 707/713 |
| 2011/0080336 A1 | 4/2011 | Leyvand et al. | |
| 2011/0093427 A1* | 4/2011 | Waite | G06N 99/005 706/52 |
| 2011/0143779 A1 | 6/2011 | Rowe et al. | |
| 2011/0176000 A1 | 7/2011 | Budge et al. | |
| 2011/0176025 A1* | 7/2011 | Anabuki | H04N 7/147 348/222.1 |
| 2011/0202310 A1 | 8/2011 | Min et al. | |
| 2011/0254950 A1* | 10/2011 | Bibby | G06T 7/0081 348/135 |
| 2011/0268321 A1 | 11/2011 | Hosoi | |
| 2011/0293136 A1* | 12/2011 | Porikli | G06K 9/00771 382/103 |
| 2011/0293180 A1 | 12/2011 | Criminisi et al. | |
| 2012/0020518 A1* | 1/2012 | Taguchi | G06T 7/2093 382/103 |
| 2012/0026277 A1 | 2/2012 | Malzbender et al. | |
| 2012/0027252 A1* | 2/2012 | Liu | G06K 9/00355 382/103 |
| 2012/0027263 A1* | 2/2012 | Liu | G06K 9/00335 382/107 |
| 2012/0051588 A1 | 3/2012 | McEldowney | |
| 2012/0086780 A1 | 4/2012 | Sharma et al. | |
| 2012/0087572 A1 | 4/2012 | Dedeoglu et al. | |
| 2012/0087575 A1 | 4/2012 | Winn et al. | |
| 2012/0117084 A1* | 5/2012 | Tang | G06T 7/2033 707/748 |
| 2012/0120196 A1 | 5/2012 | Tsai et al. | |
| 2012/0128208 A1 | 5/2012 | Leyvand et al. | |
| 2012/0148093 A1* | 6/2012 | Sharma | G06K 9/00771 382/103 |
| 2012/0154373 A1 | 6/2012 | Finocchio et al. | |
| 2012/0154542 A1 | 6/2012 | Katz et al. | |
| 2012/0169887 A1 | 7/2012 | Zhu et al. | |
| 2012/0269384 A1* | 10/2012 | Jones | G06K 9/00201 382/103 |
| 2013/0128034 A1* | 5/2013 | Carr | G06K 9/00771 348/135 |
| 2013/0156299 A1* | 6/2013 | Zhang | G06K 9/00771 382/159 |
| 2013/0169822 A1 | 7/2013 | Zhu et al. | |
| 2013/0170696 A1* | 7/2013 | Zhu | G06K 9/68 382/103 |
| 2013/0182114 A1 | 7/2013 | Zhang et al. | |
| 2013/0182904 A1 | 7/2013 | Zhang et al. | |
| 2013/0182905 A1 | 7/2013 | Myers et al. | |
| 2013/0184592 A1 | 7/2013 | Venetianer et al. | |
| 2013/0205314 A1* | 8/2013 | Ramaswamy | H04N 21/44213 725/14 |
| 2013/0243240 A1 | 9/2013 | Marks et al. | |
| 2013/0287257 A1 | 10/2013 | Dedhia et al. | |
| 2014/0055610 A1 | 2/2014 | Ko et al. | |
| 2014/0071242 A1* | 3/2014 | Lin | G06K 9/00201 348/46 |
| 2014/0139633 A1* | 5/2014 | Wang | G06K 9/00201 348/46 |
| 2014/0139660 A1* | 5/2014 | Zhu | G06K 9/00369 348/143 |
| 2014/0169663 A1* | 6/2014 | Han | G06K 9/00724 382/159 |
| 2014/0198947 A1* | 7/2014 | Xu | G06K 9/00261 382/103 |
| 2014/0270483 A1* | 9/2014 | Lucey | G06K 9/00677 382/154 |
| 2014/0285717 A1 | 9/2014 | Cai | |
| 2014/0333775 A1* | 11/2014 | Naikal | H04N 7/181 348/159 |
| 2015/0049906 A1* | 2/2015 | Fu | G06K 9/00362 382/103 |
| 2015/0154453 A1* | 6/2015 | Wilf | G06K 9/00711 382/103 |
| 2015/0227784 A1* | 8/2015 | Roy | G06T 7/0097 382/103 |
| 2015/0227795 A1* | 8/2015 | Starner | G06K 9/00671 345/156 |

FOREIGN PATENT DOCUMENTS

| | | |
|---|---|---|
| WO | WO 2014/081688 A1 | 5/2014 |
| WO | WO 2014/151303 A1 | 9/2014 |

OTHER PUBLICATIONS

Li et al—Estimating the number of people in crowded scense by MID based foreground segmentation and head shoulder detection—ICPR 2008.*

Gaikwad—New improved methodology for pedestrian detection, IJCA 2012.*

(56) References Cited

OTHER PUBLICATIONS

Hasan Celik: "Dominant Object Detection for Autonomous Vision-Based Surveillance", In: "Phd Thesis", Feb. 15, 2010 (Feb. 15, 2010), pp. 1-165.*
Li et al (NPL: estimating the number of people in crowded scene by MID based foreground segmentation and head-shoulder detection) 2009.*
Min Li et al—Rapid and robust human detection and tracking based on omega-shape features Image Processing (ICIP), 2009 16th IEEE International Conference on, Nov. 2009 pp. 2545-2548.*
Celik, Dominant object detection for autonomous vision based surveillance, Published by TU Delft Mediamatica ISBN 978-90-813811-8-5, 2010.*
Rapid and Robust Human Detection and Tracking Based on Omega-Shape Features Min Li, Zhaoxiang Zhang, Kaiqi Huang and Tieniu Tan National Laboratory of Pattern Recognition, ICIP 2009.*
Celik et al Dominant Object Detection for Autonomous Vision-Based Surveillance, In: "Phd Thesis", Feb. 15, 2010 (Feb. 15, 2010), pp. 1-165).*
Li et al—Rapid and robust human detection and tracking based on omega-shape features, image processing (ICIP), 2009, 16th IEEE).*
Anonymous, "Spectra® HD Series IP Dome System High Definition Pan/Tilt/Zoom High-Speed Dome", Pelco, Inc., Clovis, CA (2012).
Choi, W., et al., "Detecting and Tracking People using an RGB-D Camera via Multiple Detector Fusion", *2011 IEEE Int'l Conf on Computer Vision Workshops*, pp. 1076-1083, (Nov. 6, 2011).
Choudri, S., et al., "Robust Background Model for Pixel Based People Counting using a Single Uncalibrated Camera", *2009 Twelfth IEEE Int'l Workshop on Performance Evaluation of Tracking and Surveillance (Pets-Winter)*, 8 pages, (Dec. 7, 2009).
Fu, H., et al., "Real-time Accurate Crowd Counting Based on RGB-D Information", *2012 19th IEEE Int 'l Conf. on Image Processing*, pp. 2685-2688, (Sep. 30, 2012).
Janoch, A., et al., "The Berkeley 3D Object Dataset (Technical Report No. UCB/EECS-2012-85)", University of California at Berkeley, Electrical Engineering and Computer Sciences (2012).
Notification of Transmittal of the International Search Report and the Written Opinion of the International Searching Authority, or the Declaration, PCT/US2013/070688, "Method and System for Counting People Using Depth Sensor", dated May 12, 2014.
Spinello, L., et al., "People Detection in RGB-D Data", *2011 IEEE/RSJ Int 'l Conf on Intelligent Robots and Systems (IROS)*, pp. 3838-3843, (Sep. 25, 2011).

Tang, S., et al., "Histogram of Oriented Normal Vectors for Object Recognition with a Depth Sensor", *The 11th Asian Conference on Computer Vision*, Daejeon, Korea (2012).
Teichman, A. and Thrun, S., "Tracking-based semi-supervised learning", *The International Journal of Robotics Research*, 31(7):804-818, Stanford University. (2012).
Fernandez-Carbajales, V., et al., "Robust People Detection by Fusion of Evidence from Multiple Methods", *Ninth Int'l Workshop on Image Analysis for Multimedia Interactive Services, IEEE Computer Society*, pp. 55-58 (May 7, 2008).
Fardi, B., et al., "Obstacle Detection and Pedestrian Recognition Using a 3D PMD Camera", *Intelligent Vehicles Symposium 2006 IEEE*, pp. 225-230 (Jun. 13, 2006).
Garcia, A., et al., "Event detection for the TRECVID 2009 video surveillance dataset: the VPULab-UAM contribution", *Video Processing and Understanding Lab, Universidad Autonoma De Madrid, Technical Report SemanticVideo.TR.2009.02*, 13 pages (2009).
Haritaoglu, I., et al., "$W^4$: Real-Time Surveillance of People and Their Activities", *IEEE Transactions on Pattern Analysis and Machine Intelligence*, vol. 22, No. 8, pp. 809-830 (Aug. 2000).
Li, M., et al., "Rapid and Robust Human Detection and Tracking Based on Omega-Shape Features", *2009 $16^{th}$ IEEE Int'l Conference on Image Processing*, pp. 2545-2548 (Nov. 7, 2009).
Notification of Transmittal of the International Search Report and the Written Opinion of the International Searching Authority, or the Declaration, PCT/US2013/070691, "Method and Apparatus for Detecting People by a Surveillance System", date of mailing May 12, 2014.
Baxes, Gregory A., "Digital Image Processing Principles and Applications," (1994).
"Cisco Video Surveillance 2900 Series Standard Definition IP PTZ Cameras" Product Specifications, Author Unknown, Apr. 2011.
Celik, H., "Dominant Object Detection for Autonomous Vision-Based Surveillance", *Ph.D. Thesis*, pp. 1-165 (Feb. 15, 2010).
Notification of Transmittal of the International Search Report and the Written Opinion of the International Searching Authority, or the Declaration, PCT/US2014/025408, "Online Learning System for People Detection and Counting", date of mailing Jul. 10, 2014.
International Preliminary Report on Patentability for International Application No. PCT/US2014/025408, entitled "Online Learning System For People Detection and Counting," Date of issuance: Sep. 15, 2015.

* cited by examiner

ONLINE LEARNING METHOD FOR PEOPLE DETECTION AND COUNTING FOR RETAIL STORES

BACKGROUND OF THE INVENTION

Data regarding people's habits, movements, and patterns can be invaluable in the business world. Such data is constantly being collected and developed. This data can be collected using devices as simple as a counter coupled to a turnstile. While such data is limited to simply the count of people walking through a particular point, even this data is not without value. For example, it can be used to identify trends in attendance over time or for particular days in a week. This data may also be used to influence many aspects of a business. For example, if one were to look at metrics in buying, this information could be accounted for in such things as hiring and ordering.

At the forefront of generating this data is detecting people. This data is only as good as the method used to determine the presence and/or absence of people.

SUMMARY OF THE INVENTION

An embodiment of the present invention provides a method for detecting people in an image. The method comprises outputting metrics regarding people in a video frame within a stream of video frames through use of an object classifier configured to detect people. The method further comprises automatically updating the object classifier using data in at least a subset of the video frames in the stream of video frames. In an embodiment of the invention, the object classifier is updated on a periodic basis. Further, according to the principles of an embodiment of the invention, the object classifier is updated in an unsupervised manner.

An embodiment of the method of detecting people in a stream of images further comprises positioning a camera at an angle sufficient to allow the camera to capture the stream of video frames that may be used to identify distinctions between features of people and background. While an embodiment of the invention comprises outputting metrics, yet another embodiment further comprises calculating the metrics at a camera capturing the stream of video frames. An alternative embodiment of the invention comprises calculating the metrics external from a camera capturing the stream of video frames.

Yet another embodiment of the method further comprises processing the metrics to produce information and providing the information to a customer on a one time basis, periodic basis, or non-periodic basis.

In an alternative embodiment of the invention, updating the object classifier further comprises determining a level of confidence about the metrics. As described hereinabove, an embodiment of the invention updates the object classifier using data in at least a subset of video frames. In yet another embodiment, this data indicates the presence or absence of a person. In an alternative embodiment, the object classifier detects people as a function of histogram of oriented gradient (HOG) features and tunable coefficients. In such an embodiment, updating the classifier comprises tuning the coefficients.

An embodiment of the invention is directed to a system for detecting people in a stream of images. In an embodiment, the system comprises an output module configured to output metrics regarding people in a video frame within a stream of video frames through use of an object classifier configured to detect people. The system further comprises an update module configured to automatically update the object classifier using data in at least a subset of the video frames in the stream of video frames. An alternative embodiment of the system further comprises a camera positioned at an angle sufficient to allow the camera to capture the stream of video frames used to identify distinctions between features of people and background. In yet another embodiment, the system further comprises a processing module configured to process the metrics to produce information that is provided to a customer on a one time basis, periodic basis, or non-periodic basis.

In further embodiments of the system, the system and its various components may be configured to carry out the above described methods.

BRIEF DESCRIPTION OF THE DRAWINGS

The foregoing will be apparent from the following more particular description of embodiments, as illustrated in the accompanying drawings in which like reference characters refer to parts throughout the different views. The drawings are not necessarily to scale, emphasis instead being placed upon illustrating embodiments.

DETAILED DESCRIPTION

A description of example embodiments of the invention follows.

The teachings of U.S. patent application Ser. No. 13/683,977 are herein incorporated by reference in their entirety.

As presented herein, data regarding people relies upon the detection of people. The task of detecting and counting people in a scene, e.g., retail stores is challenging. Various approaches have been developed to detect and count people, and these various approaches generally rely on a variety of sensors, e.g., mechanical sensors, infrared sensors, and cameras; however, existing solutions remain inadequate.

Many of the approaches using cameras employ a pair of cameras to calculate the distance of objects from the cameras through stereo vision. This depth data is, in turn, used to determine how many people appear in front of the pair of cameras. Such a system must usually be installed overhead in order to capture top-down views, e.g., on the ceiling or roof over a building's entrances or exits. These installation constraints restrict the application of such a system.

An embodiment of the invention provides a method for detecting people that uses video streams from a camera that is arranged in a down-forward orientation. Such a method may be used in retail stores for detecting the presence or absence of people and/or how many people are in front of the down-forward camera. This is particularly advantageous because many cameras in retail stores are installed in a down-forward orientation such that the camera can capture part of a person's head and shoulders. Example of cameras that are typically oriented in a down-forward position may be cameras looking at an entry way or a cashier's desk.

Figure 1:
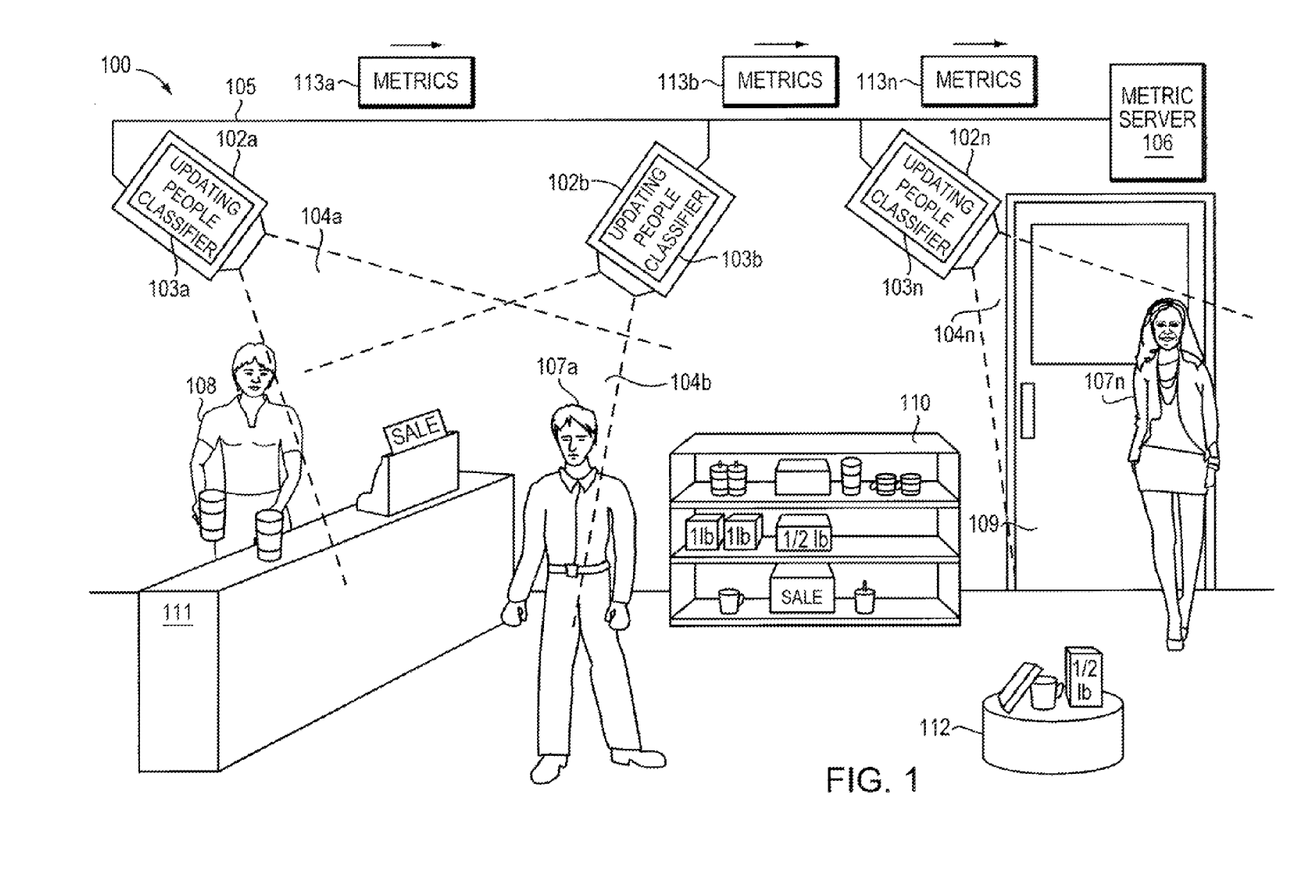
FIG. 1 is a simplified illustration of a retail scene in which an embodiment of the present invention may be implemented.

FIG. 1 is a simplified illustration of a retail scene 100 in which an embodiment of the present invention may be implemented. The retail scene 100 illustrates a typical retail environment that consumers may encounter in their day-to-day life. As described above, it would be useful for the owner of said retail establishment to have metrics regarding people in her establishment. The retail scene 100 with the entrance 109 further includes a cash register area 111. The cash register area 111 may be stationed by an employee 108. The employee 108 likely interacts with the customers 107a-n at the cash register area 111. While a single employee 108 has been illustrated in the scene 100, embodiments of the invention may be configured to detect multiple people. The scene 100 may include any number of customers 107a-n, and embodiments of the invention may be configured to detect the people in scenes with crowds of varying densities. The retail scene 100 further includes typical product placement areas 110 and 112 where customers 107a-n may browse products and select product for purchase.

The scene 100 further includes cameras 102a-n. The scene 100 may include any number of cameras and the number of cameras to be utilized in an environment may be determined by a person of skill in the art. The cameras 102a-n have respective fields of view 104a-n. These cameras 102a-n may be oriented such that the respective fields of view 104a-n are in down-forward orientations such that the cameras 102a-n may capture the head and shoulder area of customers 107a-n and employee 108. The cameras 102a-n may be positioned at an angle sufficient to allow the camera to capture a stream of video frames used to identify distinctions between features of people such as the customers 107a-n and employee 108 and the background.

The cameras 102a-n further comprise respective updating people classifiers 103a-n. The updating people classifiers 103a-n are configured to be automatically updated based upon data in at least a subset of video frames from streams of video frames captured by the cameras 102a-n. While the classifiers 103a-n are illustrated internal to the cameras 102a-n, embodiments of the invention may use classifiers that are located externally either locally or remotely with respect to the cameras 102a-n. As illustrated each camera 102a-n has a respective classifier 103a-n. An alternative embodiment of the invention may utilize a single classifier that may be located at any point that is communicatively connected to the cameras 102a-n.

The cameras 102a-n are connected via interconnect 105 to metric server 106. The interconnect 105 may be implemented using any variety of techniques known in the art, such as via Ethernet cabling. Further, while the cameras 102a-n are illustrated as interconnected via the interconnect 105, embodiments of the invention provide for cameras 102a-n that are not interconnected to one another. In other embodiments of the invention, the cameras 102a-n are wireless cameras that communicate with the metric server 106 via a wireless network.

The metric server 106 is a server configured to store the metrics 113a-n regarding people in a video frame within a stream of video frames captured by the cameras 102a-n. These metrics 113a-n may be determined by the people classifiers 103a-n. While the metric server 106 is illustrated in the scene 100, embodiments of the invention may store metrics 113a-n on a metric server that is located remotely from the scene 100. An alternative embodiment of the invention may operate without a metric server. In such an embodiment, metrics, such as the metrics 113a-n may be stored directly on the respective cameras 102a-n and further accessed directly.

While a particular camera network has been illustrated it should be clear to one of skill in the art that any variety of network configurations may be used in the scene 100.

An alternative embodiment of the invention further processes the metrics 113a-n to produce information. This information may include any such information that may be derived using people detection. For example, this information may include the number of people coming through the door 109 at various times of the day. Through use of people tracking, an embodiment of the invention may provide information for the number of customers 107a-n that go to the register 111. Information may also be derived regarding the time customers 107a-n linger or browse through the various product placements 110 and 112. This information may be analyzed to determine effective sales practices and purchasing trends. An embodiment of the invention may further allow for employee 108 monitoring. Such an embodiment may be used to determine the amount of time employees spend at the register 111 or interacting with customers throughout the retail space 100.

An example method of an embodiment of the invention in relation to the scene 100 is described hereinbelow. In an embodiment of the invention, a camera, such as the camera 102a, captures a stream of video frames. Then a classifier, such as the classifier 103a, detects the presence or absence of people within a video frame in the captured stream of video frames. Further detail regarding the process of detecting people in a video frame is discussed hereinbelow in relation to FIG. 2. Next, the camera 102a outputs metrics, such as the metric 113a, regarding people in the video frame to the metric server 106. This process can be repeated for every video frame in a stream of video frames or may be done on a periodic or random basis. The method further includes automatically updating the classifier using data in at least a subset of the video frames in the stream of video frames. In an embodiment of the invention, the classifier is updated using edge data of people's head-shoulder area, which may be referred to as the omega-shape. Because the method may use edge-derived features, it may more accurately detect people in a crowded scene. Further detail regarding updating the classifier is described hereinbelow in relation to FIG. 2.

Because the classifier is updated using data captured from the stream of video frames the classifier can adapt itself to the environment where the stream of video frames is captured. In contrast to existing solutions, where a classifier is not automatically updated, the method of the present invention may operate without pre-configuring the object classifier. Further, because the classifier automatically updates it is capable of adjusting to changing conditions, such as changes in lighting and camera setup. These advantages provide for metric gathering systems that are highly flexible and cheaper to implement. Because pre-configuration and human intervention for updating the classifier are not required, system setup and maintenance is achieved at a lower cost. Further, because many existing surveillance systems use down-forward facing cameras, an embodiment of the invention may be easily implemented in these existing systems.

Figure 2:
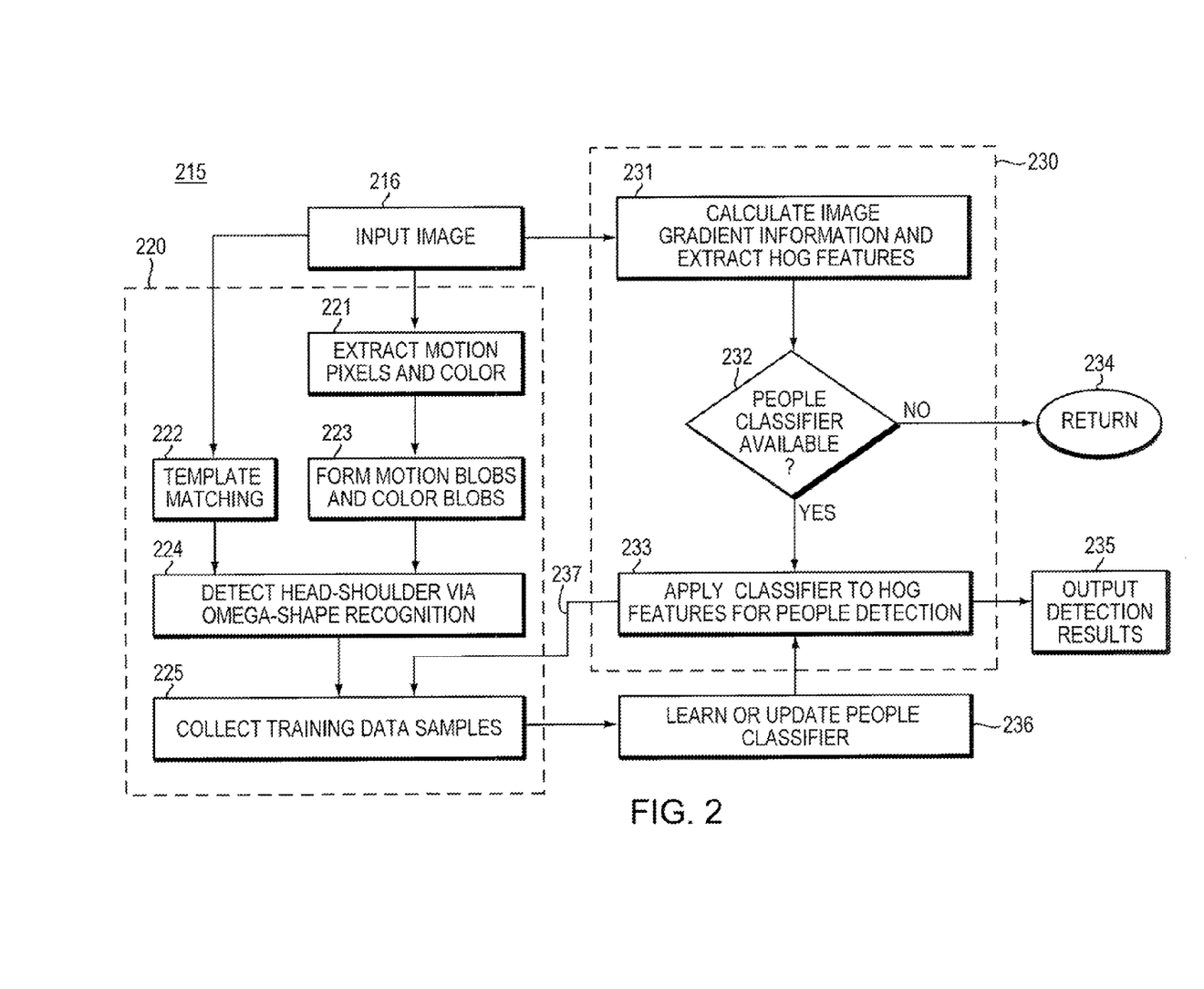
FIG. 2 is a flowchart depicting a method of detecting people in a stream of images according to principles of the present invention.

FIG. 2 is a flowchart depicting a method 215 of detecting people in a stream of images according to principles of the present invention. The method 215 begins with inputting an image (216). This image may be a video frame from a stream of video frames captured by a camera, such as the cameras 102a-n. The image is inputted into two processes, 220 and 230 of the method 215. The process 220 collects training data samples that are used to train and update a people classifier. The process 230 detects people in the image and outputs detection results (metrics) using the people classifier trained with the training data generated by the sub-process 220 as described herein.

The process 230 begins with inputting an image (216). After an image is received, image gradient information is calculated and histogram of oriented gradient (HOG) features are extracted (231). The image gradient information may be calculated and HOG features extracted in any manner as is known in the art. In an embodiment, image gradients are calculated for edge information of objects appearing in a scene, where a scene may be a video frame. Gradients may be directionally calculated, i.e., gradients may be calculated in the horizontal (x) direction and the vertical (y) direction. Thus, one can determine where gradients occur and the orientation of the determined gradients. A HOG feature may be calculated for each scanning window in the scale space of the input image. Calculating a HOG feature for each scanning window in the scale space may allow for a more thorough gradient analysis to be performed. Some image gradients are more easily determined based upon the scale of the input image, thus an embodiment of the invention determines a HOG feature for each scanning window in the scale space so as to ensure that all gradients of the image are determined. Further, an embodiment of the invention allows for tuning by setting a threshold at which gradients are considered in the analysis. For example, in an embodiment, if a gradient is too small it may be ignored.

HOG features may be represented as a multi-dimensional vector which captures the statistics of image gradients within each window in terms of the gradient orientations and associated magnitudes. These vectors however can become quite large and thus, an embodiment of the invention applies the linear discriminant analysis (LDA) method to these vectors to reduce the dimensionality of the HOG features. The LDA method may be used to reduce the dimension of HOG features through a projection. This dimension reduction may be done with the intention of maximizing the separation between positive training samples and negative training samples, training samples are discussed hereinbelow. These lower dimension HOG features are adopted to train a strong classifier using the Adaboost method. The Adaboost method combines multiple weak classifiers such that the strong classifier has a very high detection rate and a low false detection rate. To achieve target performance, i.e., high detection rate and low false detection rate, multiple strong classifiers are cascaded to form a final classifier. In practice, the classifier may detect people using edge-based HOG features, rather than using motion pixels and/or skin color, this helps to make the classifier more capable of detecting people in a crowded retail environment.

After the image gradients are calculated and the HOG features are extracted (231), the next step of the process 230 is to determine whether a people classifier exists (232). Classifiers as they are known in art can be configured to detect the presence or absence of people. A classifier may be thought of as a function, and thus a people classifier may be thought of as a function, such as $A_1 x_1 + A_2 x_2$, or any combination of feature vectors and classifier weights or parameters, the result of which indicates the presence or absence of a person. The variables of the classifier, i.e., $x_1$ and $x_2$, may be equated with the HOG features, and the coefficients, $A_1$ and $A_2$ may be tuned to improve the classifier.

Returning to the step 232, when there is no people classifier available the method returns (234). This return may bring the process back to waiting for a next image (216). The absence of a people classifier does not necessarily indicate that there is no people classifier at all, it may simply indicate that the classifier has no coefficients, as described above, or has had no training. Such a result may occur where, for example, a camera carrying out the method is deployed in the field with a classifier without any prior training. This result however is not problematic, because as explained herein, the classifier may be automatically trained once deployed. For example, if a camera is deployed with a classifier with no prior training, it may be determined upon the first run of the method that no classifier exists, however, after some time, the classifier may be automatically updated, and then the classifier will have some values with which the presence or absence of people can be determined.

If it is determined at (232) that a people classifier exists, the process proceeds and applies the classifier to the HOG features to detect the presence or absence of people (233). After the classifier is applied to the HOG features the results of the detection are output (235). This output may be to a metric server as described hereinabove in relation to FIG. 1, or may be to any communicatively connected point to the apparatus that is performing the method 215. The method may be carried out in cameras such as the cameras 102a-n, or may be carried out remotely from the cameras.

While the above described process 230 is being performed, the other sub-process 220 of the method 215 may be simultaneously occurring. In an embodiment of the invention, the process 230 is carried out at a much higher rate than the sub-process 220. For example, in an embodiment of the invention, where for example a camera is collecting a stream of video frames, the sub-process 230 may be carried out for every video frame in the stream of video frames, and the sub-process 220 may be carried out for every one hundred video frames in the stream of video frames. The rates at which the method 215 and its associated sub-processes 220 and 230 are carried out may be chosen accordingly by a person of ordinary skill in the art. Further, the rates at which the processes 220 and 230 occur may be automatically determined based upon for example the time of day, or the currently available processing power.

The function of process 220 is to develop training samples. Training samples are developed to tune the classifier used in the process 230 at step 233. While both processes 220 and 230 detect people, in an embodiment of the invention the sub-process 220 may be more processor intensive, however, resulting in more accurate detection of people. Thus, an embodiment of the method 215 uses the more accurate, albeit more processor intensive, people detection methods of process 220 to train the classifier of process 230.

The process 220 is a method wherein training samples can be developed inline, i.e., when an apparatus is deployed. Thus, as described above, if a classifier is not available at (232), the classifier may be automatically trained using the sub-process (220). To this end, the process 220 may use alternative features to identify a person in a video frame for positive sample collection. The process 220 begins with an inputted image (216). From this image, motion pixels and skin color pixels may be extracted (221). In an embodiment of the invention, a background subtraction method may be employed to detect the motion pixels. From the extracted motion and skin color pixels, motion blobs and color blobs can be formed (223). With these blobs, the head-shoulder area can be detected via omega-shape recognition (224). The process 220 may also use template matching (222) to detect head-shoulder via omega-shape recognition (224). Additionally, facial blobs may also be identified for further confirmation of a head-shoulder object. Further detail regarding these techniques is given in U.S. patent application Ser. No. 13/683,977 the contents of which are herein incorporated by reference in their entirety.

The process of collecting training samples may also benefit from the outputs of the people classifier (237). According to an embodiment of the invention, the outputs of the people classifier may also have an associated confidence level in the accuracy with which a presence or an absence of a person has been detected. This confidence level information may be used to determine classifier outputs that are used in collecting training samples (237)

Described hereinabove is the process 220, of collecting positive training samples, i.e., samples that detect the presence of a person. The method 215 also benefits from negative samples, i.e., samples detecting the absence of a person. Negative samples may be collected randomly both in the time domain and in the spatial domain. For example, any image patch without motion or any motion image patch that is confirmed not belonging to any head-should part of people may be considered a candidate for a negative sample.

As presented above this process may be conducted online, i.e., when the camera or associated apparatus performing people detection is deployed. Training samples may also be collected offline, i.e., before the camera or associated apparatus is deployed. Collecting samples offline may also comprise the collection of training samples by another camera or device and then using these results to train a subsequent classifier. If training data is available from offline collection, a base classifier to be used in the above described method can be trained in advance by applying the above process to this data. Thus, this classifier may serve as a seed classifier which can be further updated on the fly, as described above, if more camera-specific training samples are developed using the process 220 described hereinabove. However, a seed classifier may not be well suited for a camera or apparatus carrying out the above described process if the training data used to seed the classifier were not directly obtained from this camera, or if the training data was obtained using a prior camera configuration or setup. Because of these problems, an embodiment of the invention collects training data, i.e., positive and negative samples as described above using the process 220, and updates the classifier automatically.

As described hereinabove, the sub-process 220 of the method 215, collects training samples. These training samples may then be used to learn or update the classifier (236). The classifier may be updated on a one time, periodic, or non-periodic basis. Further the classifier may be updated in an unsupervised manner. In an embodiment of the invention, updating the classifier comprises tuning coefficients of the classifier.

Figure 3:
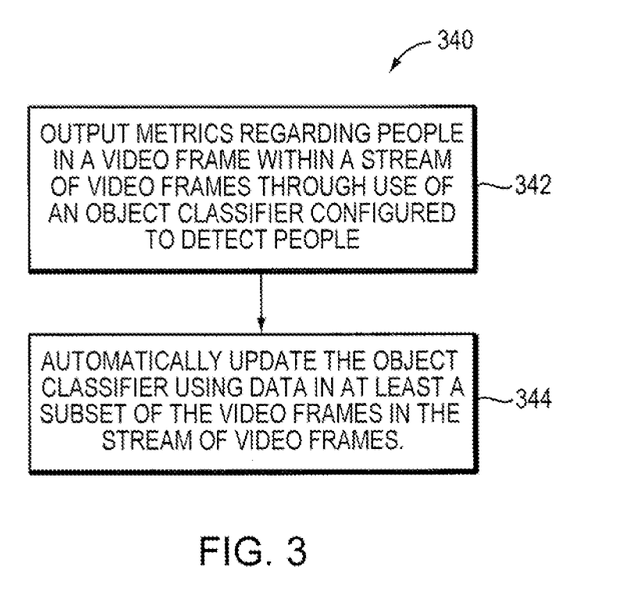
FIG. 3 is a flowchart depicting a method of detecting people according to an embodiment of the present invention.

FIG. 3 is a flowchart depicting a method 340 of detecting people according to an embodiment of the present invention. The method 340 outputs metrics regarding people in a video frame through use of an object classifier configured to detect people (342). The process of detecting people using an object classifier and outputting these metrics may be accomplished using image gradients and HOG features as described hereinabove in relation to FIG. 2. The method 340 further comprises automatically updating the object classifier using data in at least a subset of the video frames in the stream of video frames. This update may refer to the process (236) of learning and updating the classifier described hereinabove in relation to FIG. 2. Further, the data used to update the classifier may be training samples as discussed in relation to FIG. 2.

Figure 4:
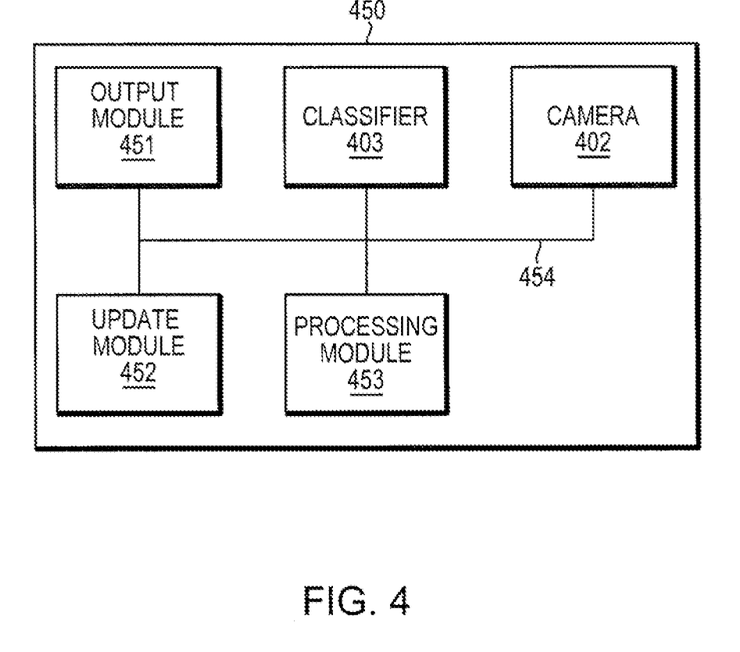
FIG. 4 is a simplified block diagram of a system for detecting people.

FIG. 4 is a simplified block diagram of a system 450 for detecting people according to principles of the present invention. The system 450 comprises the interconnect 454 which serves as an interconnection between the various components of the system 450. Connected to the interconnect 454 is an output module 451. The output module 451 is configured to output metrics regarding people in a stream of video frames using the communicatively connected classifier 403. The classifier 403 is configured to detect people and may be embodied as the classifier described hereinabove in relation to FIGS. 1 and 2. The system 450 comprises an update module 452. The update module 452 is configured to automatically update the classifier 403 using data in at least a subset of video frames. The updating process may be as described hereinabove and the data used may be positive and negative training data samples collected through use of sub-process 220 described hereinabove in relation to FIG. 2.

The system 450 may further comprise a camera 402 to capture the stream of video frames used by the output module 451 to output metrics regarding people through use of the classifier 403. While the system 450 is depicted as comprising the camera 402, according to an alternative embodiment, the camera 402 is separated from the system 450 and communicatively connected such that a stream of video frames captured by the camera 402 can be received at the system 450.

An alternative embodiment of the system 450 further comprises a processing module 453. The processing module 453 can be used to further process the metrics to produce information. This further processing may produce any number of statistics as described in detail hereinabove in relation to FIG. 1. In an embodiment of the invention such information may be provided in graphical or table form.

Figure 5:
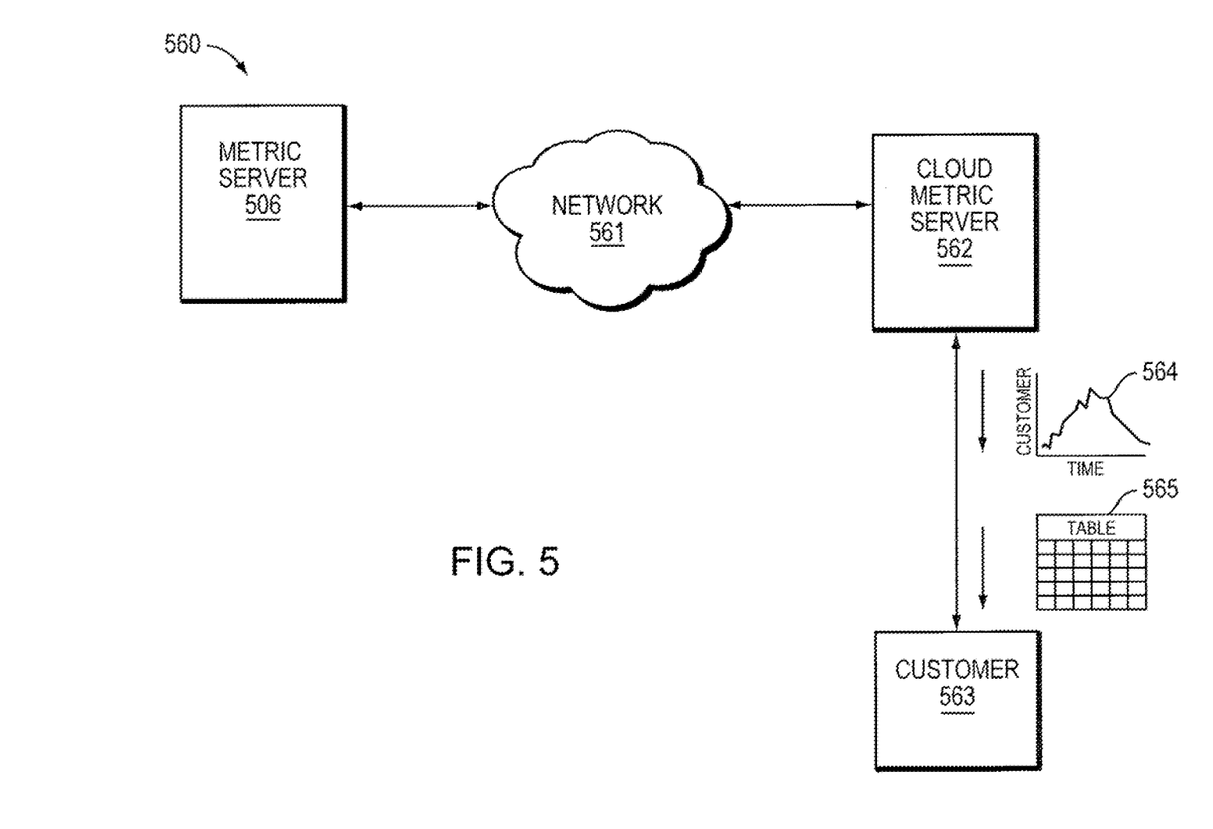
FIG. 5 is a simplified diagram of a network environment that may be utilized by an embodiment of the present invention.

FIG. 5 is a simplified diagram of a network environment 560 that may be utilized by an embodiment of the present invention. The network environment 560 comprises metric server 506. Metric server 506 may embody metric server 106 as described hereinabove in relation to FIG. 1. Metric server 506 is configured to store metric data resulting from embodiments of the invention. These metrics may result from the method 215, method 340, and/or system 450, described hereinabove in relation to FIGS. 2-4 respectively. Metric server 506 is communicatively connected via network 561 to cloud metric server 562. Network 561 may be any network known in the art including a local area network (LAN) or wide area network (WAN). Cloud metric server 562 may comprise the metrics stored on the metric server 506. Further, the cloud metric server 562 may store metrics from a multitude of metric servers that are communicatively connected to the cloud metric server 562.

The cloud metric server 562 is communicatively connected to a customer 563. The metric server 562 may transfer stored metrics to the customer 563. Metrics may take any form and may be further processed to produce information that is transferred to the customer 563. Such further processing may be used to generate graphs, such as graph 564, and tables, such as table 565, which may be transferred to the customer 563. This information may include any number of statistics as described hereinabove in relation to FIG. 1.

Figure 6:
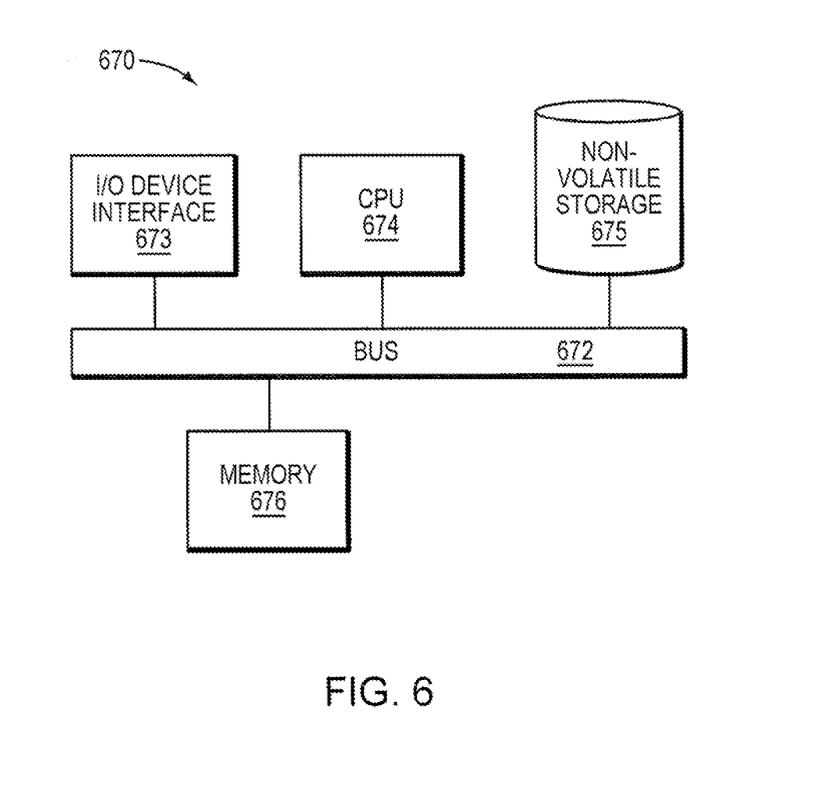
FIG. 6 is a simplified block diagram of a computer system in which embodiments of the present invention may be embodied.

FIG. 6 is a high level block diagram of a computer system 670 in which embodiments of the present invention may be embodied. The system 670 contains a bus 672. The bus 672 is a connection between the various components of the system 670. Connected to the bus 672 is an input/output device interface 673 for connecting various input and output devices, such as a keyboard, mouse, display, speakers, etc. to the system 670. A Central Processing Unit (CPU) 674 is connected to the bus 672 and provides for the execution of computer instructions. Memory 676 provides volatile storage for data used for carrying out computer instructions. Disk storage 675 provides non-volatile storage for software instructions, such as an operating system (OS).

It should be understood that the example embodiments described above may be implemented in many different ways. In some instances, the various methods and machines described herein may each be implemented by a physical, virtual, or hybrid general purpose computer, such as the computer system 670. The computer system 670 may be transformed into the machines that execute the methods described above, for example, by loading software instruction into either memory 676 or non-volatile storage 675 for execution by the CPU 674.

Embodiments or aspects thereof may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of detecting people in a stream of images, the method comprising:
outputting metrics regarding people in a first subset of video frames within a stream of video frames through use of an object classifier configured to detect people as a function of image gradients calculated for edge information of objects, histogram of oriented gradient (HOG) features extracted from the image gradients calculated for the edge information, and automatically tunable coefficients; the edge information including edge data of a head-shoulder area of the people;
identifying training samples by detecting a head-shoulder area in a second subset of video frames within the stream of video frames using at least one of (i) template matching and (ii) motion blobs and color blobs extracted from motion pixels and skin color pixels, the second subset of video frames including fewer frames than the first subset of video frames; and
automatically updating the object classifier using the training samples identified.

2. The method of claim 1 wherein automatically updating the object classifier includes updating on a periodic basis.

3. The method of claim 1 wherein automatically updating the object classifier is done in an unsupervised manner.

4. The method of claim 1 further comprising positioning a camera at an angle sufficient to allow the camera to capture the stream of video frames used to identify distinctions between features of people and background.

5. The method of claim 1 further comprising calculating the metrics at a camera capturing the stream of video frames.

6. The method of claim 1 further comprising calculating the metrics external from a camera capturing the stream of video frames.

7. The method of claim 1 further comprising:
processing the metrics to produce information; and
providing the information to a customer on a one time basis, periodic basis, or non-periodic basis.

8. The method of claim 1 wherein automatically updating the object classifier further comprises determining a level of confidence about the metrics.

9. The method of claim 1 wherein the training samples indicate a presence or an absence of people.

10. The method of claim 1 wherein the classifier detects people as a function of histogram of oriented gradient (HOG) features and tunable coefficients and wherein updating the classifier comprises automatically tuning the coefficients.

11. A system for detecting people in a stream of images, the system comprising:
an output module implemented by a processor, the output module configured to output metrics regarding people in a first subset of video frames within a stream of video frames through use of an object classifier configured to detect people as a function of image gradients calculated for edge information of objects, histogram of oriented gradient (HOG) features extracted from the image gradients calculated for the edge information, and automatically tunable coefficients; the edge information including edge data of a head-shoulder area of the people; and
an update module implemented by the processor and configured to:
identify training samples by detecting a head-shoulder area in a second subset of video frames within the stream of video frames using at least one of (i) template matching and (ii) motion blobs and colors blobs extracted from motion pixels and skin color pixels, the second subset of video frames including fewer frames than the first subset of video frames; and
automatically update the object classifier using the training samples identified.

12. The system of claim 11 wherein the update module is further configured to update the object classifier on a periodic basis.

13. The system of claim 11 wherein the update module is configured to update the object classifier in an unsupervised manner.

14. The system of claim 11 further comprising a camera positioned at an angle sufficient to allow the camera to capture the stream of video frames used to identify distinctions between features of people and background.

15. The system of claim 11 further comprising a camera configured to capture the stream of video frames and calculate the metrics.

16. The system of claim 11 wherein the metrics are calculated external from a camera capturing the stream of video frames.

17. The system of claim 11 further comprising a processing module configured to process the metrics to produce information, the information to be provided to a customer on a one time basis, periodic basis, or non-periodic basis.

18. The system of claim 11 wherein automatically updating the object classifier further comprises determining a level of confidence about the metrics.

19. The system of claim 11 wherein the training samples indicate a presence or an absence of people.

20. The system of claim 11 wherein the classifier detects people as a function of histogram of oriented gradient (HOG) features and tunable coefficients and wherein updating the classifier comprises automatically tuning the coefficients.

21. A non-transitory computer readable medium having stored thereon a sequence of instructions which, when loaded and executed by a processor coupled to an apparatus, causes the apparatus to:

output metrics regarding people in a first subset of video frames within a stream of video frames through use of an object classifier configured to detect people as a function of image gradients calculated for edge information of objects, histogram of oriented gradient (HOG) features extracted from the image gradients calculated for the edge information, and automatically tunable coefficients; the edge information including edge data of a head-shoulder area of the people;

identify training samples by detecting a head-shoulder area in a second subset of video frames within the stream of video frames using at least one of (i) template matching and (ii) motion blobs and color blobs extracted from motion pixels and skin color pixels, the second subset of video frames including fewer frames than the first subset of video frames; and automatically update the object classifier using the training samples identified.

* * * * *

UNITED STATES PATENT AND TRADEMARK OFFICE
CERTIFICATE OF CORRECTION

| | | |
|---|---|---|
| PATENT NO. | : 9,639,747 B2 | Page 1 of 1 |
| APPLICATION NO. | : 13/839410 | |
| DATED | : May 2, 2017 | |
| INVENTOR(S) | : Hongwei Zhu et al. | |

It is certified that error appears in the above-identified patent and that said Letters Patent is hereby corrected as shown below:

In the Claims

In Claim 10, Column 10, Lines 15-19, replace "The method of claim 1 wherein the classifier detects people as a function of histogram of oriented gradient (HOG) features and tunable coefficients and wherein updating the classifier comprises automatically tuning the coefficients." with --The method of claim 1 wherein updating the classifier comprises automatically tuning the coefficients.--

In Claim 20, Column 11, Lines 3-7, replace "The system of claim 11 wherein the classifier detects people as a function of histogram of oriented gradient (HOG) features and tunable coefficients and wherein updating the classifier comprises automatically tuning the coefficients." with --The system of claim 11 wherein updating the classifier comprises automatically tuning the coefficients.--

Signed and Sealed this
Twenty-seventh Day of June, 2017

Joseph Matal
*Performing the Functions and Duties of the
Under Secretary of Commerce for Intellectual Property and
Director of the United States Patent and Trademark Office*